(12) United States Patent
Herrington et al.

(10) Patent No.: US 12,305,757 B2
(45) Date of Patent: May 20, 2025

(54) FLARE TIP HAVING REDUCED GAS LEAKAGE

(71) Applicant: John Zink Company, LLC, Tulsa, OK (US)

(72) Inventors: Adam B. Herrington, Tulsa, OK (US); Jaime A. Erazo, Broken Arrow, OK (US); Wesley R. Bussman, Tulsa, OK (US); Jeff W. White, Tulsa, OK (US)

(73) Assignee: John Zink Company, LLC

( * ) Notice: Subject to any disclaimer, the term of this patent is extended or adjusted under 35 U.S.C. 154(b) by 446 days.

(21) Appl. No.: 17/640,407

(22) PCT Filed: Aug. 31, 2020

(86) PCT No.: PCT/IB2020/058088
§ 371 (c)(1),
(2) Date: Mar. 4, 2022

(87) PCT Pub. No.: WO2021/044278
PCT Pub. Date: Mar. 11, 2021

(65) Prior Publication Data
US 2022/0325798 A1     Oct. 13, 2022

Related U.S. Application Data

(60) Provisional application No. 62/895,993, filed on Sep. 5, 2019.

(51) Int. Cl.
*F16J 15/06*     (2006.01)
*F23G 7/08*     (2006.01)

(52) U.S. Cl.
CPC .............. *F16J 15/062* (2013.01); *F23G 7/08* (2013.01)

(58) Field of Classification Search
CPC . F16J 15/062; F16J 15/32; F16J 15/56; F23G 7/08; F23D 14/22; F23D 14/26;
(Continued)

(56) References Cited

U.S. PATENT DOCUMENTS 3,833,337 A * 9/1974 Desty .................. F23G 7/08
239/DIG. 7
4,073,613 A    2/1978 Desty
(Continued)

FOREIGN PATENT DOCUMENTS

GB     1459087 A     12/1976

OTHER PUBLICATIONS

International Preliminary Report on Patentability received for PCT Application No. PCT/IB2020/058088, mailed on Mar. 17, 2022, 08 Pages.
(Continued)

*Primary Examiner* — Logan M Kraft
*Assistant Examiner* — Johnny H Hoang

(57) ABSTRACT

At least some embodiments a flare includes a gasket sized and shaped to prevent gas-leakage at the gas slot when pressure of gas entering the flare is below a designed minimum opening pressure that causes the flare bowl to move away from the tip housing. At least some embodiments of a flare includes a diaphragm spring coupled with the flare bowl to assist in movement of the flare bowl with respect to the tip housing to vary an opening dimension of a gas-exit slot defined by the flare bowl and the tip housing.

22 Claims, 15 Drawing Sheets

(58) Field of Classification Search
CPC .......... F23D 14/62; Y10S 239/07; F24H 1/06; F24H 1/186; F24H 1/20; F23M 5/025
See application file for complete search history.

(56) References Cited

U.S. PATENT DOCUMENTS

| | | | | |
|---|---|---|---|---|
| 4,344,751 | A * | 8/1982 | Chesters | F23G 7/085 |
| | | | | 431/202 |
| 4,634,372 | A * | 1/1987 | Allum | F23G 7/08 |
| | | | | 239/DIG. 7 |
| 6,065,459 | A * | 5/2000 | Stevens | F02B 29/02 |
| | | | | 123/590 |
| 11,543,122 | B2 * | 1/2023 | Aguado Vela | F23D 14/04 |
| 2007/0281266 | A1 * | 12/2007 | Rajewski | F23G 7/08 |
| | | | | 431/202 |
| 2010/0291492 | A1 * | 11/2010 | Poe | F23G 7/085 |
| | | | | 431/5 |
| 2011/0030561 | A1 | 2/2011 | Wiggins et al. | |

OTHER PUBLICATIONS

International Search Report and Written Opinion received for PCT Application No. PCT/IB2020/058088, mailed on Oct. 28, 2020, 09 Pages.

* cited by examiner

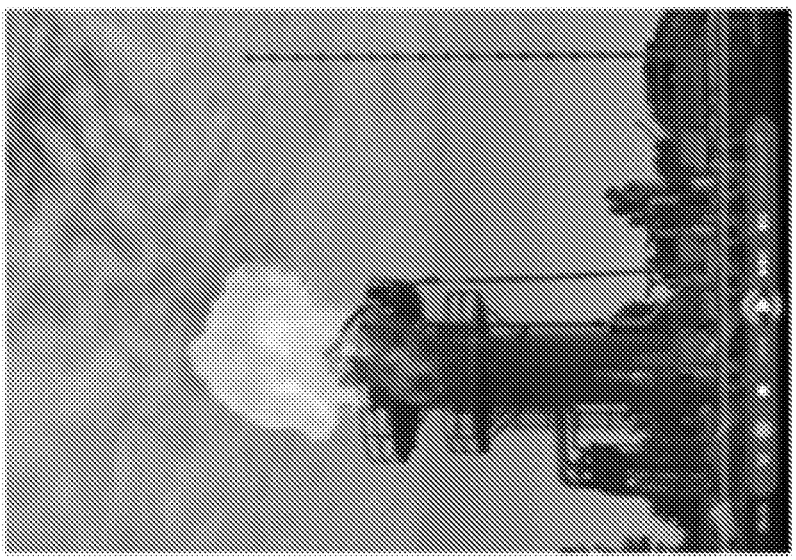
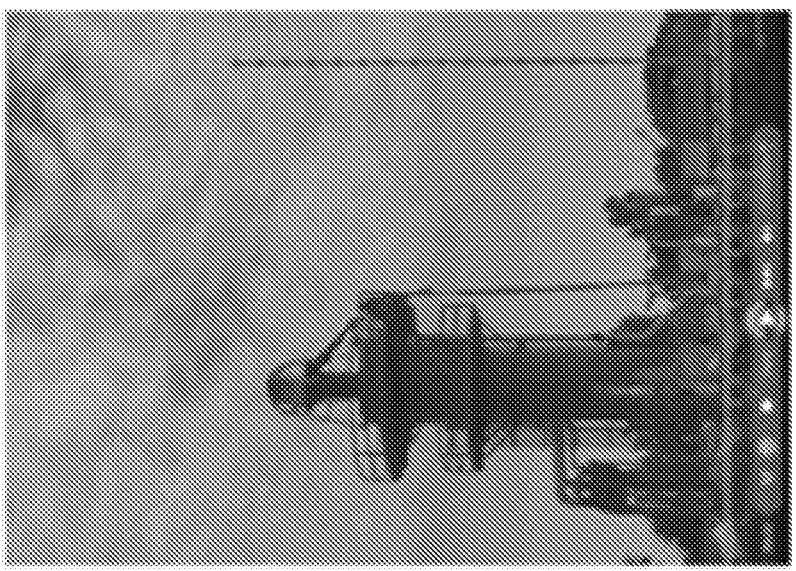
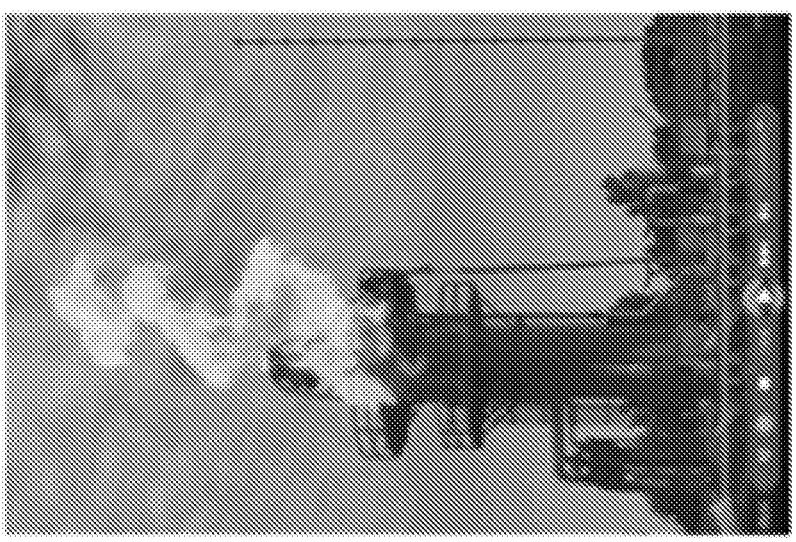
FIG. 14

FLARE TIP HAVING REDUCED GAS LEAKAGE

RELATED APPLICATION

This application is a filing under 35 U.S.C. 371 as the National Phase of International Patent Application No. PCT/IB2020/058088, filed on Aug. 31, 2020, which claims the benefit of and priority from, U.S. Patent Application Ser. No. 62/895,993, filed Sep. 5, 2019. The entire contents of each of the aforementioned applications are incorporated herein as if fully set forth.

BACKGROUND

Process plants use flaring systems to burn excess gas within the system. Flares receive gas from a header system and ignite the received gas to combust the gas composition. FIG. 1 depicts a process system 100 including a process plant 102 (e.g., a process heater) that pushes excess gas into a header 104 that is received by a flare 106 which combusts the excess gas.

FIG. 2 depicts a cross section of a prior art flare 200 (and/or flare tip), which is an example of the flare 106 of FIG. 1. Flare 200 is an example of a pressure-assisted variable-slot flare. Flare 200 includes a flare bowl 202 that is movably coupled with a tip housing 204 to allow the flare bowl 202 to move along longitudinal axis 206 of the flare 200. The flare bowl 202 is rigidly coupled to a mounting shaft 208. The mounting shaft 208 is mounted within a shaft mount 210 that is fixedly attached to the tip housing 204 such that the mounting shaft 208 is slidably retained along axis 206.

Movement of the flare bowl 202 with respect to the tip housing 204 is caused by pressure building within the tip housing 204 due to gas being output from the process plant 102 via header 212 (which is similar to header 104 of FIG. 1). Gas within FIG. 2 is depicted as bold arrows. To resist in lifting of the flare bowl 202 with respect to the tip housing 204, disc springs 214 (e.g., Belleville washers) are stacked longitudinally about the mounting shaft 208. Disc springs 214 may be pre-loaded via nut 216 and flat washer 218. Disc springs 214 are located within a spring casing 220. Spring casing 220 is mounted to the mounting shaft 208 via casing-mount nut 222. Spring casing 220 is shown spaced from shaft mount 210 by distance 224. As flare bowl 202 moves away from tip housing 204, the distance 224 shrinks until the spring casing 220 contacts shaft mount 210 thereby stopping further movement of flare bowl 202 away from tip housing 204.

The disc springs 214 apply a variable force depending on the position of the flare bowl 202 relative to the tip housing 204. Different gas pressures from the header 212 cause the flare bowl 202 to lift to different heights. FIG. 3 depicts Section A of FIG. 2 in further detail, showing the contact point between flare bowl 202 and tip housing 204. Although the flare bowl 202 and the tip housing 204 may contact each other, when there is even a small amount of gas pressure within the tip housing 204 from the header 212, the gas may leak between this contact point because it is not a true seal. The space between the tip housing 204 and the flare bowl 202, at which gas exits (shown by the bold arrow in FIG. 3) to ambient environment, is referred to herein as a "gas-slot". This gas is ignited causing a constant, even if small, flame to impinge the flare bowl 202. This constant flame impingement reduces service life of the flare bowl 202 and/or tip housing 204 and requires more frequent maintenance.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

FIG. 14 shows images of the flare output during the window of FIG. 13.

DETAILED DESCRIPTION OF THE EMBODIMENTS

Figure 4:
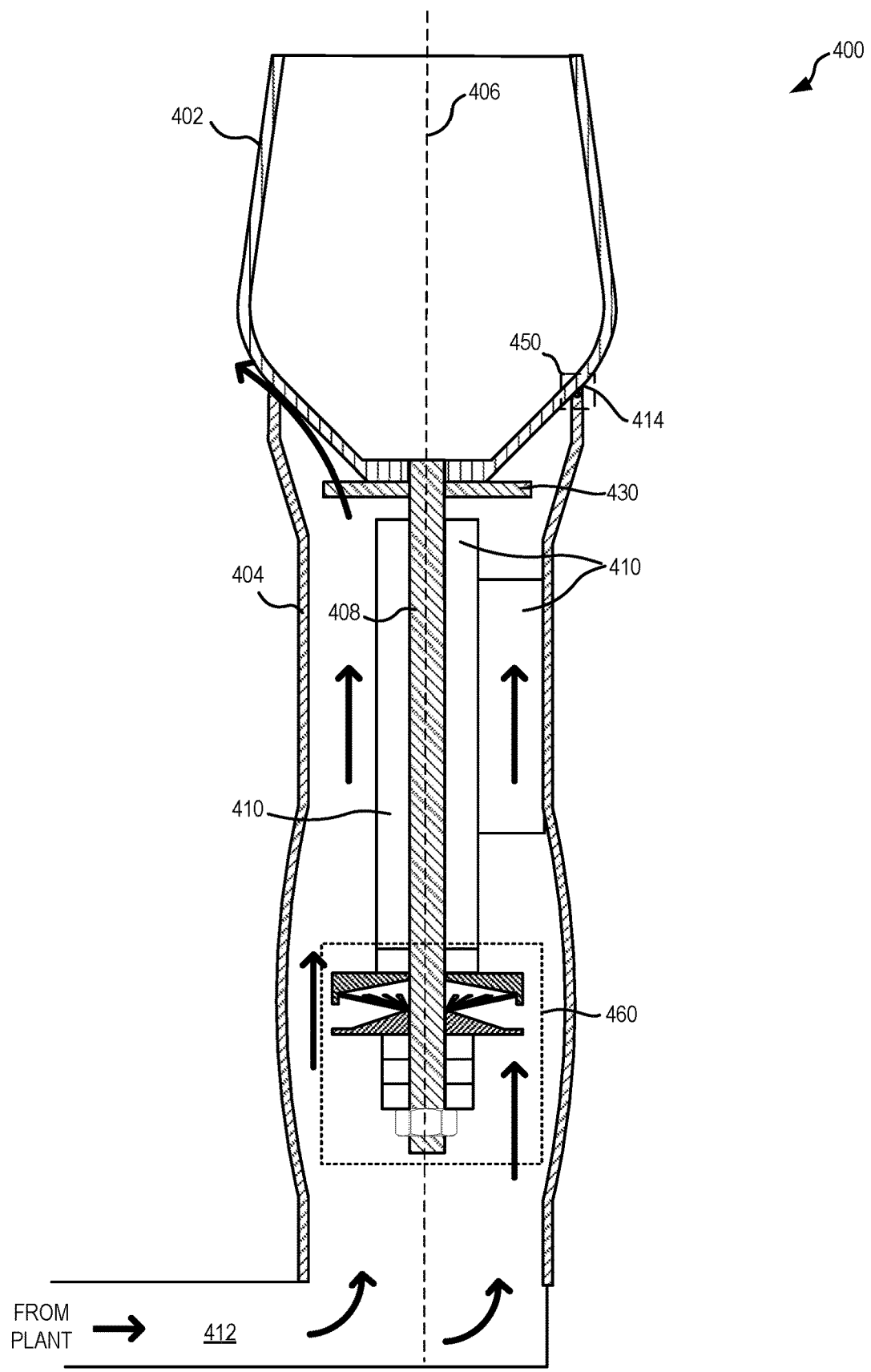
FIG. 4 depicts a cross section of a flare including a seal system and diaphragm spring system, in embodiments.

FIG. 4 depicts a cross section of a flare 400 including a seal system 450 and a diaphragm spring system 460, in embodiments. Although flare 400 is shown having both seal system 450 and diaphragm spring system 460, it should be appreciated that each of the seal system 450 and the diaphragm spring system 460 may be implemented independently without the other.

Flare 400 is an example of a pressure-assisted variable-slot flare. Flare 400 includes a flare bowl 402 that is movably coupled with a tip housing 404 such that the flare bowl 402 moves along longitudinal axis 406 of the flare 400. In at least some embodiments, the flare 400 may be a coanda-based flare wherein the flare bowl 402 may be shaped to exert a coanda-effect on gas exiting the flare 400. The flare bowl 402 is rigidly coupled to a mounting shaft 408. The mounting shaft 408 is mounted within a shaft mount 410 that is fixedly attached to the tip housing 404 such that the mounting shaft 408 is slidably retained along axis 406.

Figure 1:
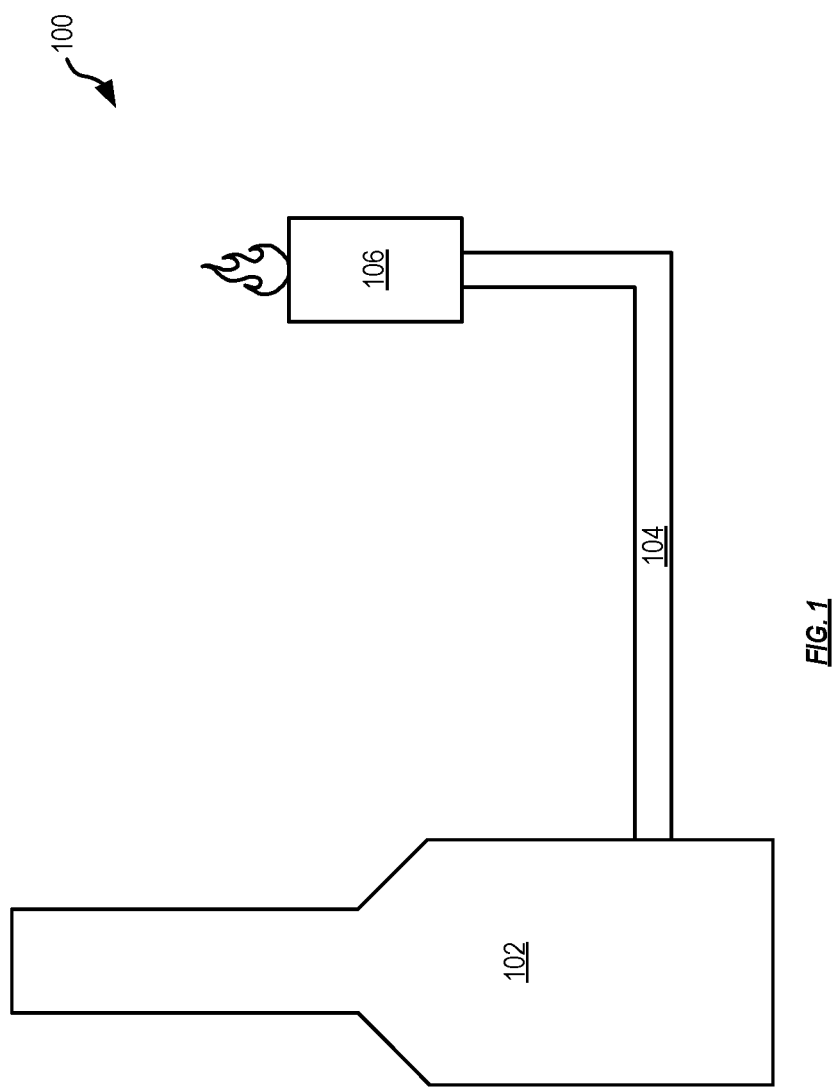
FIG. 1 depicts a process system including a process plant (e.g., a process heater) that pushes excess gas into a header that is received by a flare which combusts the excess gas.
Figure 2:
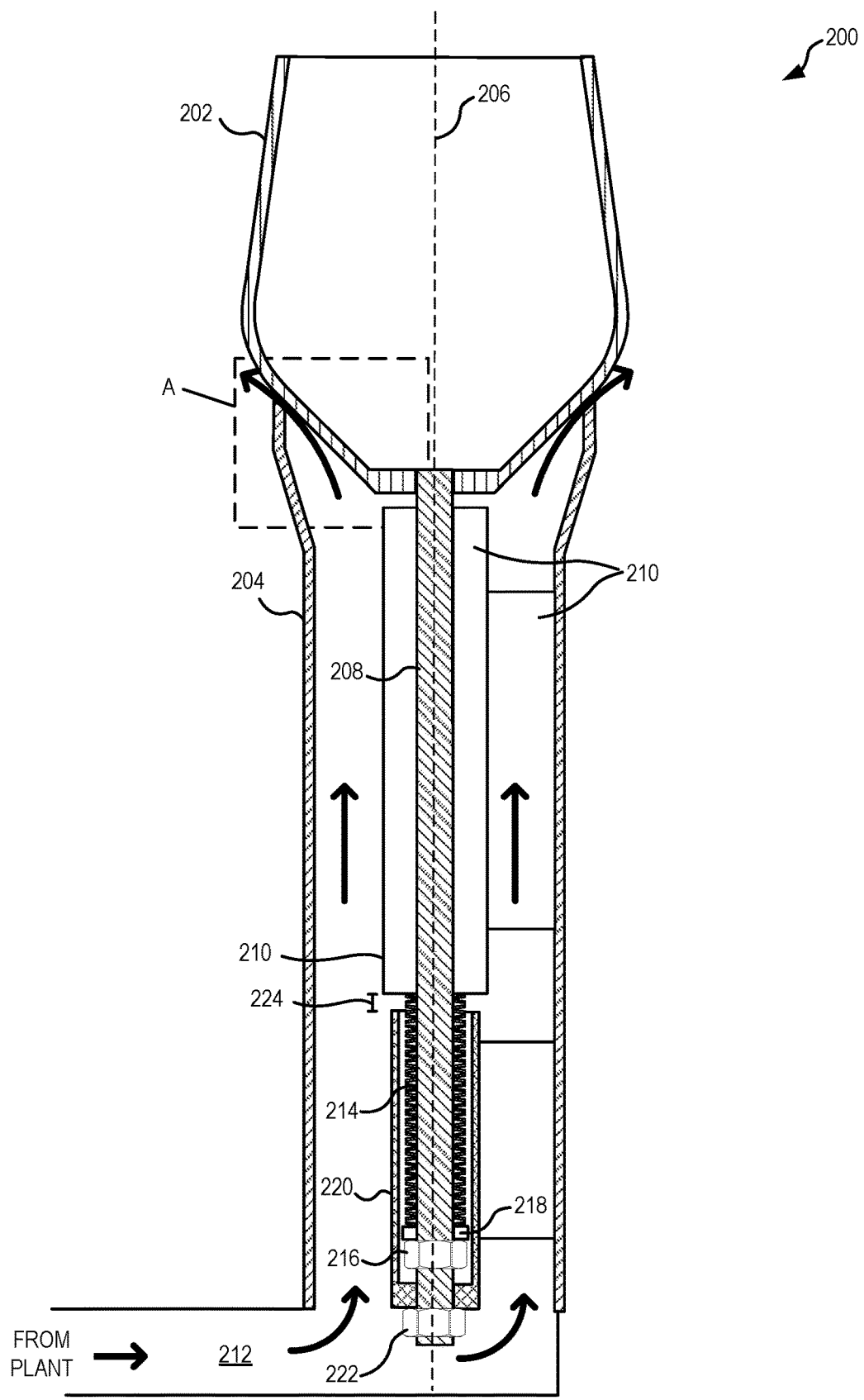
FIG. 2 depicts a cross section of a prior art flare, which is an example of the flare of FIG. 1.
Figure 3:
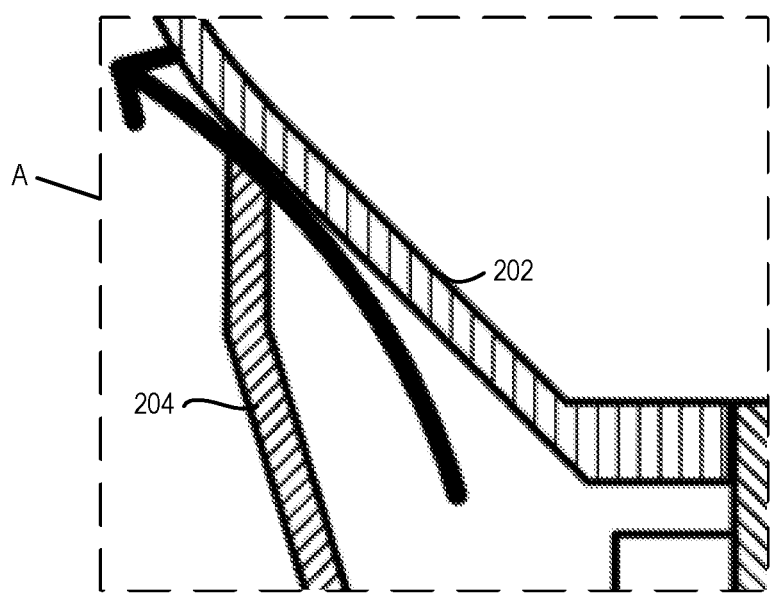
FIG. 3 depicts Section A of FIG. 2 in further detail, showing the contact point between flare bowl and tip housing.

Movement of the flare bowl 402 with respect to the tip housing 404 is caused by pressure building within the tip housing 404 due to gas being output from the process plant 102 via header 412 (which is similar to header 104 of FIG. 1). The bold arrows in FIG. 4 indicate gas flow. The gas exits the flare 400 at a gas-exit slot 414 created by the space between the flare bowl 402 and the tip housing 404. Although gas is only shown exiting the flare 400 on the left side between the flare bowl 402 and the tip housing 404, it should be appreciated that gas may exit around the entire circumference of the flare bowl 402 and the tip housing 404—in other words, the gas-exit slot 414 may be created about the entire circumference of the flare bowl 402 and the tip housing 404.

Figure 5:
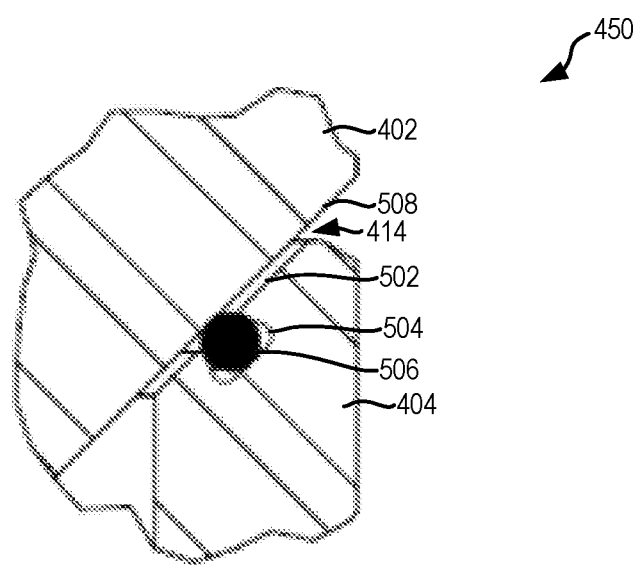
FIG. 5 depicts the seal system in further detail, in an embodiment.

FIG. 5 depicts the seal system 450 in further detail, in an embodiment. To create a seal between the flare bowl 402 and the tip housing 404, a gas-exit edge 502 of the tip housing 404 forms a notch 504. A gasket 506 is secured within the notch 504. In at least some embodiments, the gasket 506 is sized and shaped to prevent gas-leakage at the gas-exit slot 414 when pressure of gas entering the flare 400 is below a designed minimum opening pressure that causes the flare bowl 402 to move away from the tip housing 404 along longitudinal axis 406. The gasket 506 may be made from any material capable of sealing the gas-exit slot 414 and withstanding operating temperatures of the flare 400. For example, the gasket 506 may be formed from any of metallic, ceramic, elastomeric materials, or the combination thereof.

Metal gasket materials include any of pure metals, precious metals, precious metal alloys, iron alloys, stainless steel alloys, zinc alloys, gallium alloys, beryllium alloys, copper alloys, nickel alloys, lead alloys, chromium alloys, aluminum alloys, cobalt alloys, molybdenum alloys, tungsten alloys, magnetic alloys, energized seals (electrical, magnetic, spring, non-spring), graphite alloys, laminated metals such as stainless steel graphite or other laminated materials, and the combination thereof.

Ceramic gasket materials include any of alumina, aluminum titanate, beryllia, boride, calcium silicate, ceria, fused silica, mullite, nitride, silicide, silicon carbide, silicon nitride, tungsten carbide, zirconia, ceramic oxides, ceramic non-oxides, ceramic composites, and combinations thereof.

Elastomeric gasket materials include any of unsaturated rubbers, saturated rubbers, thermoplastic rubbers, thermoset rubbers, rubbers found under ASTM D1418 (including but not limited to: M-Type rubbers, N-Type rubbers, O-Type rubbers, Q-Type rubbers, R-Type rubbers, R-Type modified rubbers, T-Type rubbers, U-Type rubbers, Z-Type rubbers, undesignated rubbers), buna-N (nitrile), butyl, chloroprene, epichlorohydrin, ethylene/acrylic, ethylene-propylene, fluorocarbon, fluorosilicone, nitrile, hydrogenated, perfluoroelastomer, polyacrylate, polysulfide, polytetrafluoroethyne, polyurethane, silicone, styrene butadiene, tetrafluoroethylene/propylene, and combinations thereof.

Operating temperatures of the flare 400 (which impact the required material of the gasket 506) may include, but are not limited to, temperatures at and within the range of negative 300 degrees Fahrenheit to 2200 degrees Fahrenheit.

In at least some embodiments, instead of being within the tip housing 404, the notch 504 is located in a gas-exit edge 508 of the flare bowl 402. Accordingly, the gasket 506 may be secured within a gasket notch within the gas-exit edge of the flare bowl 402.

In at least some embodiments, the gasket 506 is not located in the gas-exit edge 502 or 508, but instead is located on a mounting component of the flare bowl 402. For example, referring to FIG. 4, the flare bowl 402 may be mounted to the mounting shaft 408 at a shaft flange 430. The shaft flange 430 is shown spaced apart from the surface of the tip housing 404. However, in at least some embodiments not depicted in FIGS. 4 and 5, the shaft flange 430 extends sufficiently far from longitudinal axis 406 to nearly contact the tip housing 404, and gasket 506 is part of the interface between the shaft flange 430 and the tip housing 404. Furthermore, in at least some embodiments, more than one gasket 506 is included. For example, one gasket could be located on the flare bowl 402, and another on the tip housing 404. The multiple gaskets could interact with each other to create the seal, or could interact with separate (or the same) components of the flare 400 to create the seal.

Figure 6:
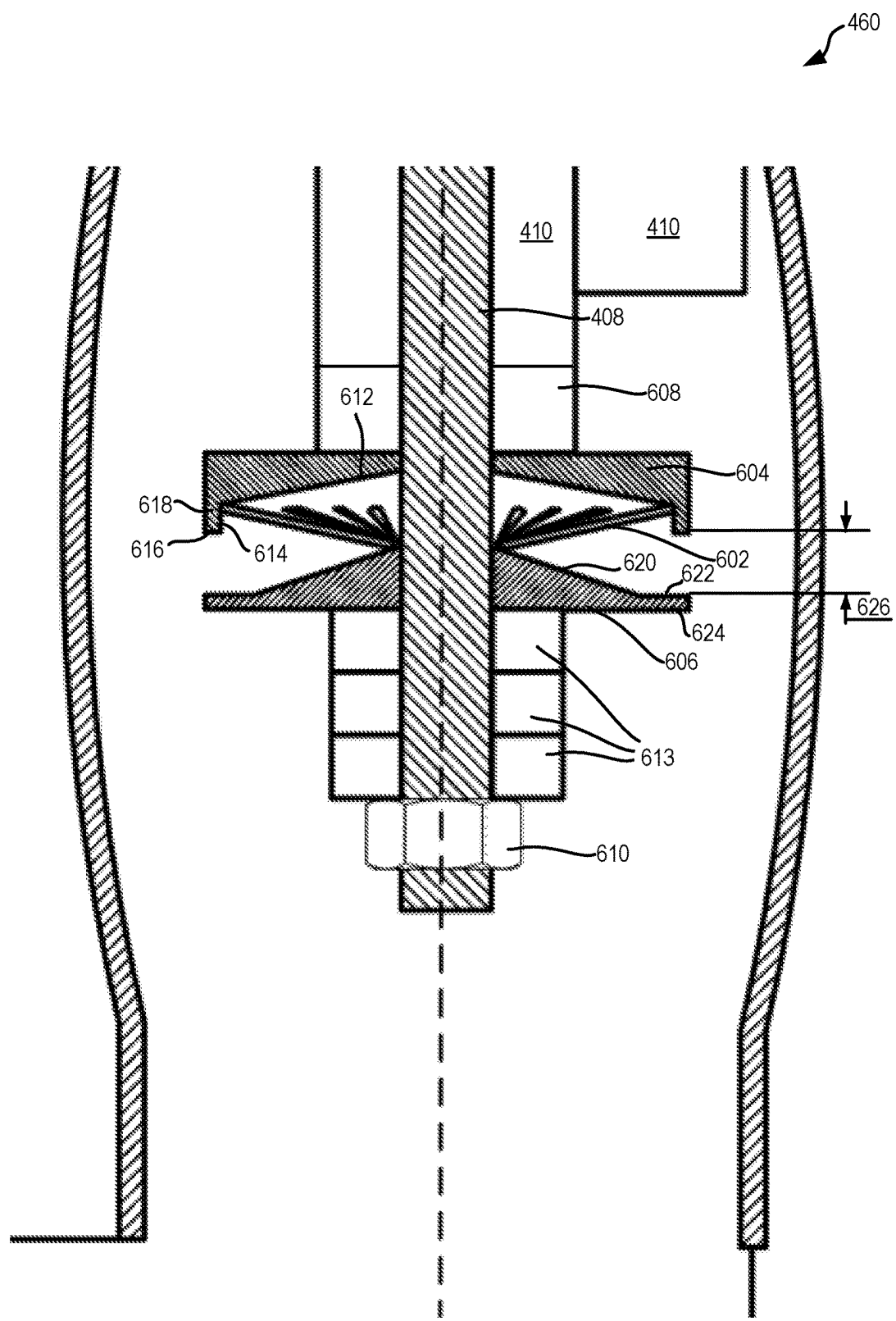
FIG. 6 depicts the diaphragm spring system in further detail, in embodiments.

FIG. 6 depicts the diaphragm spring system 460 in further detail, in an embodiment. The diaphragm spring system 460 includes a diaphragm spring 602 operatively coupled with the flare bowl 402 to regulate movement of the flare bowl 402 with respect to the tip housing 404 to vary an opening dimension of the gas-exit slot 414. The diaphragm spring 602 is shown located in a spring casing which includes a first-case portion 604 and a second-case portion 606. The mounting shaft passes through the first-case portion 604 (or, otherwise, the fixedly-mounted one of the first-case portion 604 and the second-case portion 606) and is coupled with the second-case portion 606 (or otherwise, the non-fixedly-mounted one of the first-case portion 604 and the second-case portion 606). In at least some embodiments, the spring casing may be located at other locations within the flare 400, such as adjacent (or attached directly to) the flare bowl 402 where the first-case portion 604 or second-case portion 606 is fixedly mounted to the tip housing 404 and the first-case portion 604 or second-case portion 606 is mounted at the flare bowl 402 with the mounting shaft 408 passing through the first-case portion 604 (or, otherwise, the fixedly-mounted one of the first-case portion 604 and the second-case portion 606) and coupled with the second-case portion 606 (or otherwise, the non-fixedly-mounted one of the first-case portion 604 and the second-case portion 606).

In the embodiment of FIGS. 4 and 6, the flare bowl 402 is coupled to the mounting shaft 408. The tip housing 404 is mounted exterior to a shaft mount 410 which is configured to retain the mounting shaft 408 along the longitudinal axis 406 with respect to the tip housing 404 such that the flare bowl 402 is movable with respect to the tip housing 404 along the longitudinal axis 406. The first-case portion 604 (or, in at least some embodiments, the second-case portion 606) is fixedly positioned with respect to the tip housing 404. For example, the first-case portion 604 may be fixedly coupled to the shaft mount 410. The first-case portion 604 may be directly, fixedly coupled to the shaft mount 410, or may be indirectly fixedly coupled to the shaft mount 410, such as via a case mount spacer 608. In at least some embodiments, instead of being coupled to shaft mount 410, the first-case portion 604 may be fixedly coupled to the tip housing 404, or another component of the flare 400 that doesn't move with the flare bowl 402.

The diaphragm spring 602 is located between the first-case portion 604 and the second-case portion 606. The second-case portion 606 is coupled to the mounting shaft 408. For example, the second-case portion 606 may be directly coupled to the mounting shaft 408 (such as, but not limited to, via threaded-attachment, bonding, welding, or integral forming of the second-case portion 606 with the mounting shaft 408). In at least some embodiments, the second-case portion 606 is indirectly coupled to the mounting shaft 408. As shown in FIGS. 4 and 6, in at least some embodiments, the second-case portion 606 is retained onto the mounting shaft 408 via a second-case-portion-retaining nut 610 threaded to the mounting shaft 408 such that the second-case portion is between the second-case-portion-retaining nut 610 and the first-case portion 604. In at least some embodiments, a plurality of spacers 613 are located between the second-case-portion-retaining nut 610 and the second-case portion 606.

In at least some embodiments, the diaphragm spring 602 has a degressive-negative load-deflection characteristic. In at least some embodiments, the diaphragm spring 602 has a degressive-negative-progressive load-deflection characteristic. In at least some embodiments, the diaphragm spring 602 has a degressive-horizontal load-deflection characteristic. In at least some embodiments, the diaphragm spring 602 has a degressive-horizontal-progressive load-deflection characteristic.

Figure 7:
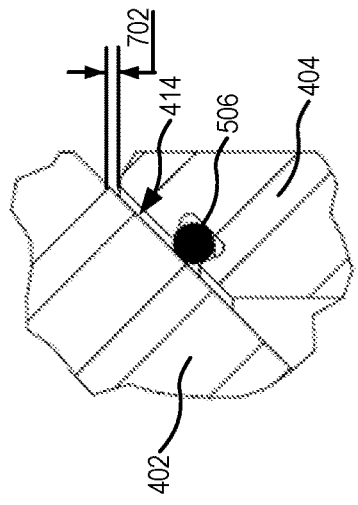
FIGS. 7-9 depict the spring system and the corresponding gas-exit slot in a no-compression, pre-compression, and full-compression configuration, respectively, in embodiments.
Figure 7:
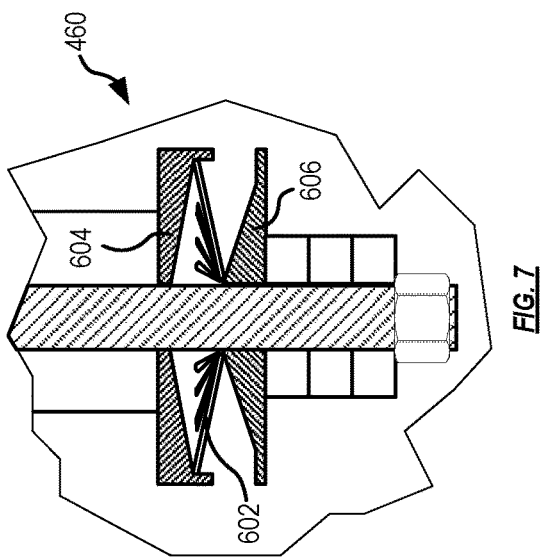
Figure 8:
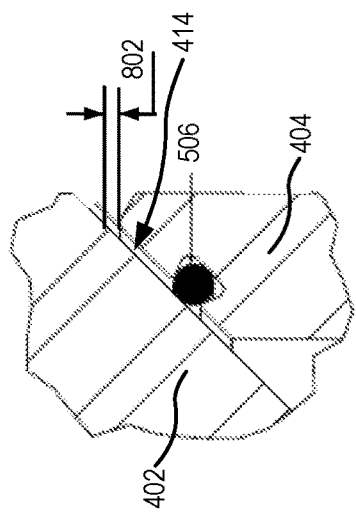
Figure 8:
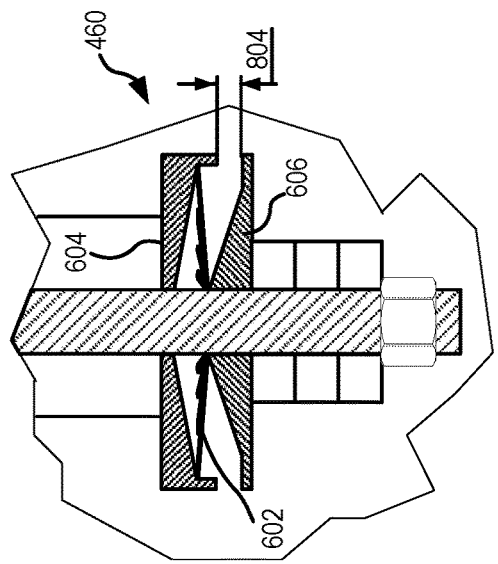
Figure 9:
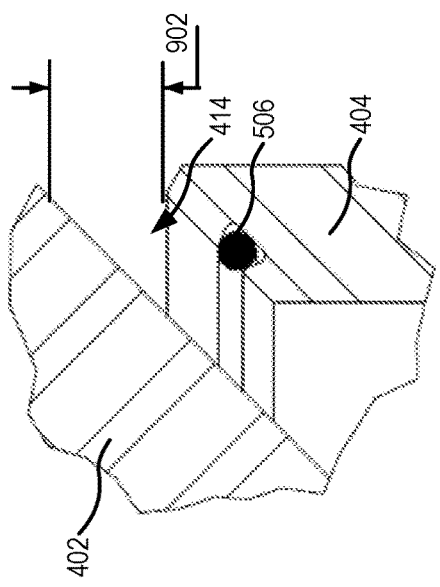
Figure 9:
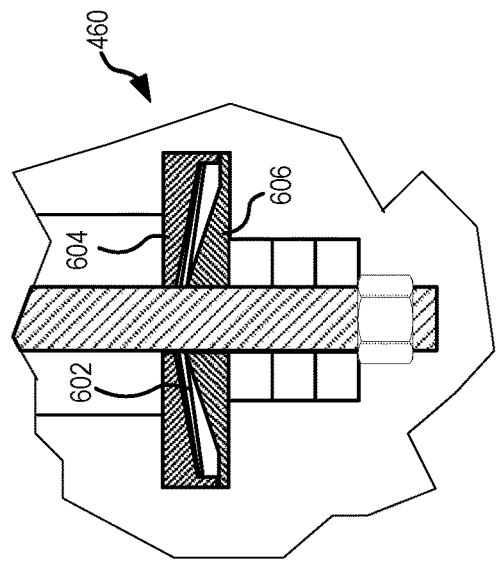

In at least some embodiments, the diaphragm spring 602 is pre-compressed by a pre-compression distance. For example, movement (of the second-case-portion-retaining nut 610 (or the second-case portion 606 directly), such as via tightening of the second-case-portion-retaining nut 610 may cause the second-case portion 606 to move towards the first-case portion 604 and apply a force against the diaphragm spring 602 to pre-compress the diaphragm spring 602. FIGS. 7-9 depict the spring system 460 and the corresponding gas-exit slot 414 in a no-compression, pre-compression, and full-compression configuration, respectively, in at least some embodiments. Distance 702 represents the gas-exit slot 414 when the diaphragm spring 602 is not compressed and the weight of the flare bowl 402 and associated mounting components (such as the components forming the actuation assembly including flare bowl 402, mounting shaft 408, shaft flange 430, and diaphragm spring system 460) is "closing" the gas-exit slot 414. Distance 802 represents the gas-exit slot 414 when the diaphragm spring 602 is pre-compressed and the weight of the flare bowl 402 and associated mounting components as well as a force exerted by the diaphragm spring 602 is "closing" the gas-exit slot 414. Distance 902 represents the gas-exit slot 414 when the diaphragm spring 602 is compressed due to gas pressure within the tip housing 404. The force exerted by the gas pressure is greater than the diaphragm spring 602 force allowing the "opening" of gas-exit slot 414. Distance 702 is greater than or equal to distance 802 both of which are less than distance 902.

The pre-compression distance may be selected such that the gas-exit slot 414 remains closed when pressure of gas entering the flare 400 (via the header 412) is below a designed minimum opening pressure that causes the flare bowl to move away from the tip housing. In the embodiments of FIGS. 7-9, the pre-compression distance is selected such that the gas-exit slot 414 remains closed based on the gasket 506 touching the gas-exit surface of bowl 402, but a distance 802 between the bowl 402 and the tip housing 404 is greater than or equal to 0.0 mm. However, in at least some embodiments not including the gasket 506, the pre-compression distance is selected such that the gas-exit slot 414 is closed by virtue of the distance 802 equaling 0.0 mm. In at least some embodiments, a first-dimension change 804 in a height of the diaphragm spring 602 results in a second-dimension change (e.g., the difference between distance 802 and 902) in the axial opening dimension of the gas-exit slot 414. However, in at least some embodiments, the first-dimension change 804 does not equal the second-dimension change.

As shown in FIGS. 8-9, as the pressure builds in the tip housing 404, the second-case portion 606 is pressed against the diaphragm spring 602 causing the diaphragm spring 602 to further compress. Depending on the load-deflection characteristic of the diaphragm spring 602, once the diaphragm spring 602 crosses a compression threshold (e.g., due to the gas within the header 412 reaching the minimum opening pressure), the diaphragm spring 602 fully compresses, and the second-case portion 606 moves towards and contacts the first-case portion 604, as shown in FIG. 9.

Figure 10:
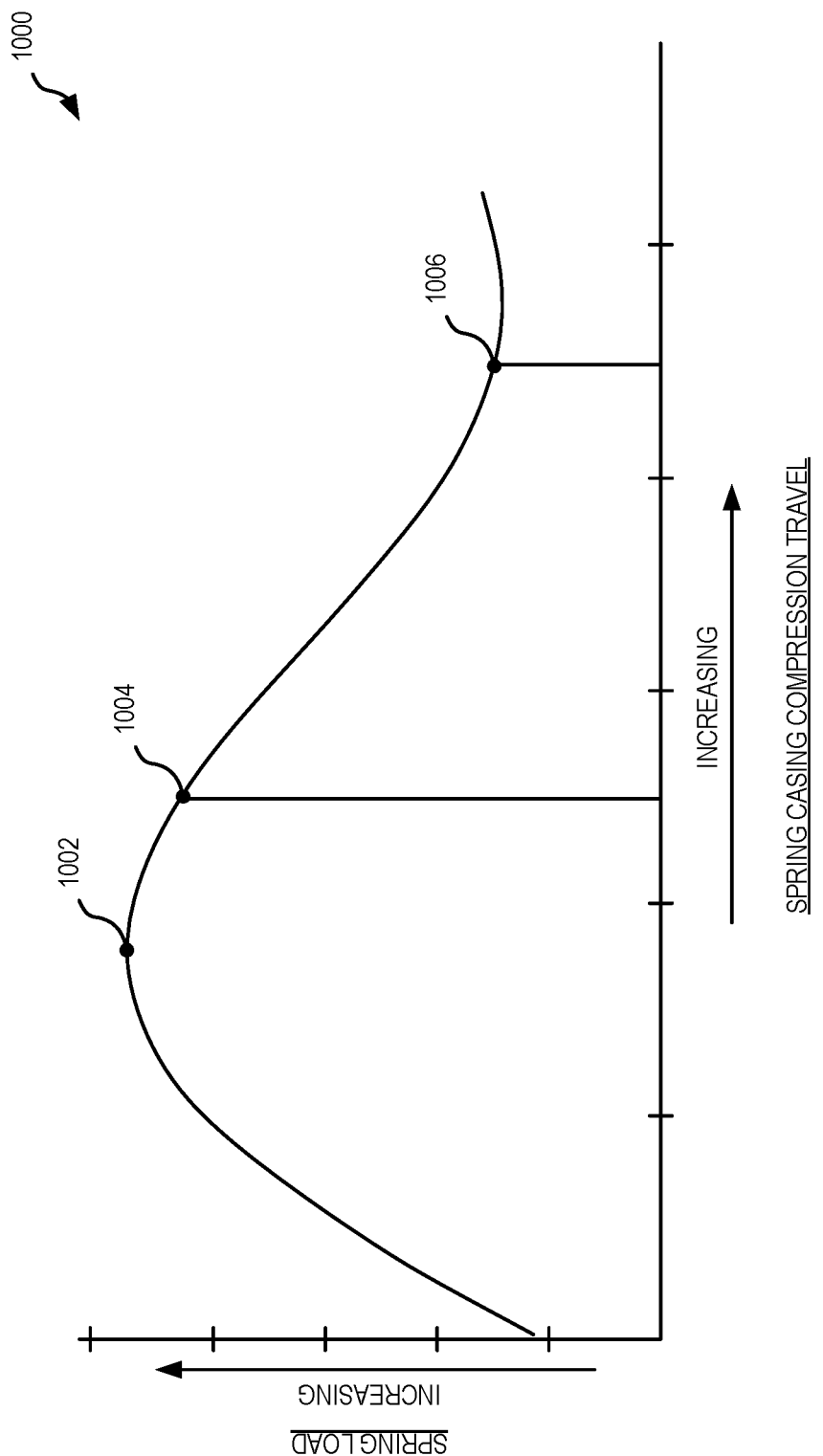
FIG. 10 depicts a load-deflection curve of the diaphragm spring, in an embodiment.

FIG. 10 depicts a load-deflection curve 1000 of the diaphragm spring 602, in an embodiment. By pre-compressing the diaphragm spring 602 (particularly when the diaphragm spring 602 has a degressive-negative-progressive load-deflection characteristic such as that shown in FIG. 10) past the maximum force 1002 which delineates the degressive and negative portions of the load-deflection curve, the spring 602 will travel from the pre-compressed state (FIG. 8) to a fully compressed state (FIG. 9) and remain there so long as the gas pressure is greater than or equal to a minimum retraction pressure at which the diaphragm spring 602 has enough force to counteract the incoming gas pressure and move the second-case portion 606 away from the first-case portion 604 (e.g. back to the pre-compression configuration of FIG. 8). In at least some embodiments, the minimum retraction pressure is less than the minimum operating pressure. In FIG. 10, the diaphragm spring 602 is pre-compressed by a given force to pre-compression distance 1004 (past the maximum force location (e.g., location 1002) on the load-deflection curve of the diaphragm spring). Thus, if the input gas (e.g. via header 412) has a minimum opening pressure that is enough to overcome the force exerted by the diaphragm spring 602 at the pre-compression distance 1004, then the diaphragm spring 602 will compress to location 1006 (so long as the gas pressure remains at or above the minimum retraction pressure) because the diaphragm spring 602 at 1004 has a negative compression characteristic. The diaphragm spring 602 at location 1006 is at the full-compressed state, e.g., corresponding to the gas-exit slot 414 reaching distance 902 and where the first-case portion 604 contacts the second-case portion 606.

Selection of the pre-compression distance changes the minimum opening pressure of the flare 400. Although pre-compression distance 1004 is shown to the right of (e.g., past) the maximum force 1002, in at least some embodiments, the spring 602 may be pre-compressed to the left (e.g., before) the maximum force 1002. In at least some embodiments, the pre-compression distance (e.g., distance 1004) is configured such that a minimum opening pressure of the flare is 0 PSI. In such embodiments, any input gas will cause the spring 602 to partially compress and open the gas-exit slot 414.

In at least some embodiments, the pre-compression distance is configured such that the minimum opening pressure is greater than 0 . For example, in one embodiment, the minimum retraction pressure is 5 PSI or greater. This allows the flare to hold a designed pressure of incoming gas without opening the gas-exit slot 414.

After compression of the diaphragm spring 602 to the compressed-state, as the gas pressure in the tip housing 404 reduces to or below the minimum retraction pressure, the diaphragm spring 602 retracts from full-compressed position 1006 back to pre-compressed position 1004. This configuration allows the gas-exit slot 414 to open or close quickly depending on the gas pressure within the tip housing 404. When the spring is at the pre-compressed position 1004, the gas-exit slot 414 is closed because there is force exerted by the diaphragm spring 602 that holds the gas-exit slot 414 closed against gasket 506. Thus, no gas is exiting the flare 400 which reduces and/or eliminates constant flame impinging on the flare bowl 402 and/or tip housing 404 thereby increasing the lifespan of the flare 400 and reducing required maintenance.

Figure 11:
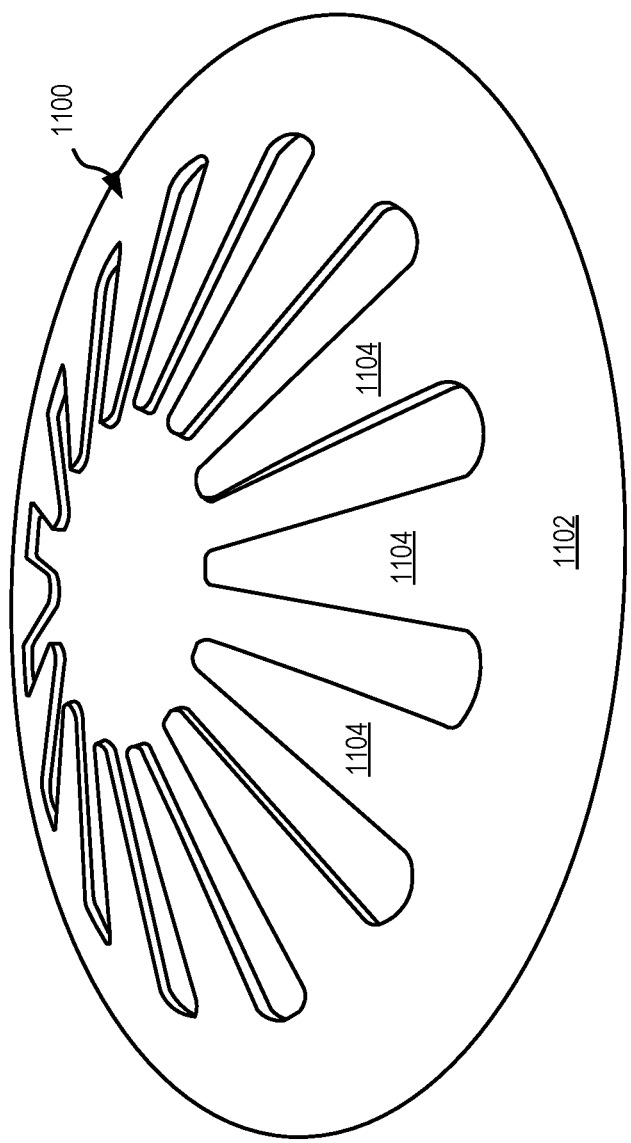
FIG. 11 depicts an example diaphragm spring, which is an embodiment of the diaphragm spring of FIG. 6.

FIG. 11 depicts an example diaphragm spring 1100, which is an embodiment of the diaphragm spring 602. The diaphragm spring 1100 includes an annular ring 1102 and a plurality of fingers 1104 extending inward therefrom. As known to those of ordinary skill, configuration of the annular ring 1102 and the plurality of fingers 1104 at least partly determines the load-deflection characteristic curve of the spring.

Figure 12:
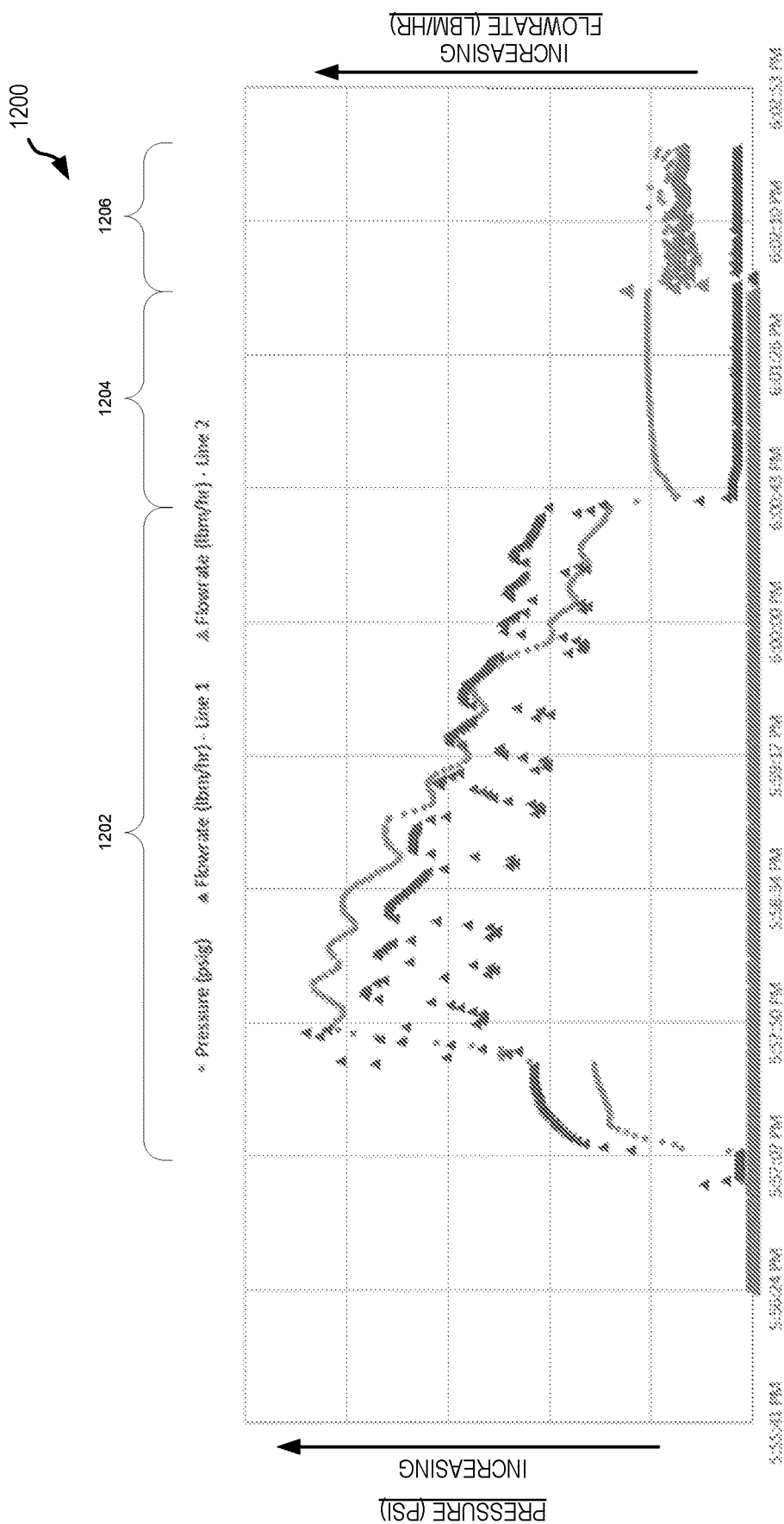
FIG. 12 depicts a gas-pressure test diagram showing operating conditions of the flare, in an example.
Figure 13:
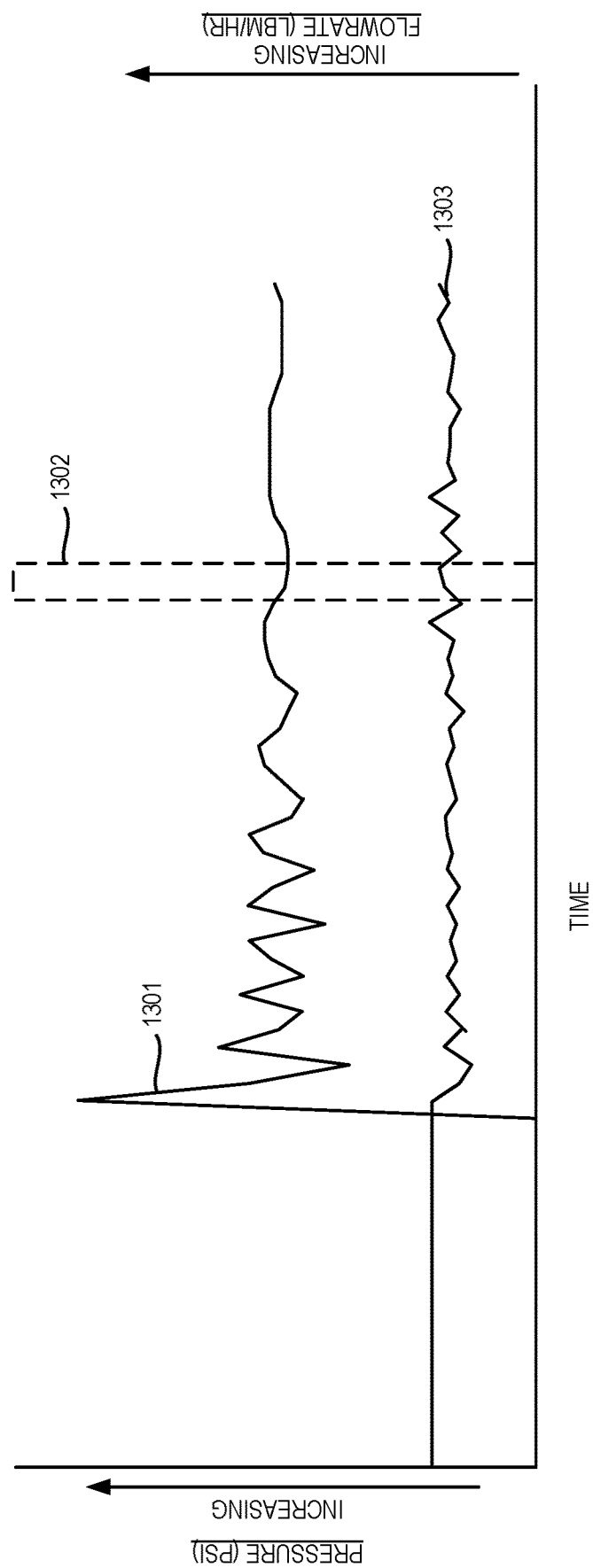
FIG. 13 depicts the cycling section of FIG. 12 in further detail.

FIG. 12 depicts a gas-pressure test diagram 1200 showing operating conditions of the flare 400, in an example. In section 1202, the gas entering the system is sufficient pressure above the minimum opening pressure and the minimum retraction pressure to open the gas-exit slot 414 and keep the slot open. In section 1204, the gas entering the system is below the minimum opening pressure such that the gas-exit slot 414 is closed and no gas leakage is observed. In section 1206, the gas-exit slot 414 is cycling between an open and closed positions. FIG. 13 depicts section 1206 in further detail. As shown in FIG. 13, as the gas-exit slot 414 cycles between an open and closed position, the pressure 1301 inside the flare tip cycles between the minimum opening pressure and the minimum retraction pressure. The flow rate 1303 only oscillates slightly. FIG. 14 shows images of the flare output during window 1302.

Referring to FIG. 6, the first-case portion 604 is shown with a first-case-portion inclined surface 612 that extends to a spring-retaining surface 614 that extends to a first-stop surface 616. The mounting shaft 408 extends through the first-case portion 604 in an aperture that spans at least the thickness of the first-case portion 604. The spring-retaining surface 614 and the first-stop surface 616 are shown as components of a stop-projection 618 extending from the first-case portion 604. It should be appreciated, however, that the stop-projection 618 may be spaced apart from the inclined surface 612 such that the spring-retaining surface 614 does not extend to the first-stop surface 616. In at least some embodiments, the first-case-portion inclined surface 612 is conical, the spring-retaining surface 614 is cylindrical, and the first-stop surface 616 is planar.

The second-case portion 606 includes a second-case-portion inclined surface 620 that extends to a second-stop surface 622 which is a portion of stop-flange 624. The stop-flange 624 cooperates with the stop projection 618 to define a stop-point of the second-case portion 606 with respect to the first-case portion 604. As the second-case portion 606 gets closer or farther away from the first-case portion 604, distance 626 changes. In embodiments, the inverse of the value of a first change in a distance 626 between the first-stop surface 616 and the second-stop surface 622 equals a second change in the axial opening dimension of the gas-exit slot 414. In at least some embodiments, the second-case-portion inclined surface 620 is conical and the second-stop surface 622 is planar. The first-stop surface 616 and the second-stop surface 622 may have other shapes without departing from the scope hereof, such as corresponding conical, jagged, hemispherical, toroidal inclined, or other shapes without departing from the scope hereof, so long as the surfaces act to stop movement of the second-case portion 606 with respect to the first-case portion 604.

Figure 15:
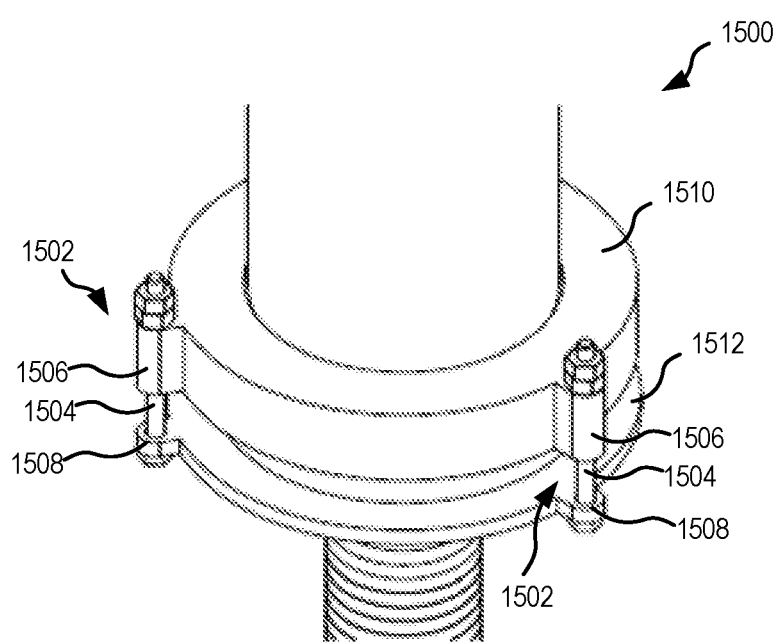
FIG. 15 depicts an isometric view of a diaphragm spring system, including a plurality of casing guides, in an embodiment.

FIG. 15 depicts an isometric view of a diaphragm spring system 1500, including a plurality of casing guides 1502, in an embodiment. Diaphragm spring system 1500 is an embodiment of diaphragm spring system 460 and thus the above discussion of diaphragm spring system 460 above applies equally to diaphragm spring system 1500. The casing guides 1502 include rods 1504 that couple to the first-case portion 1510 (e.g. first-case portion 604) and second-case portion 1512 (e.g., second-case portion 606). In at least some embodiments, the rods 1504 span through protrusions 1506 and 1508 on the first-case portion 1510. Although two guides 1502 are shown, any number of guides 1502 may be included without departing from the scope hereof.

Figure 16:
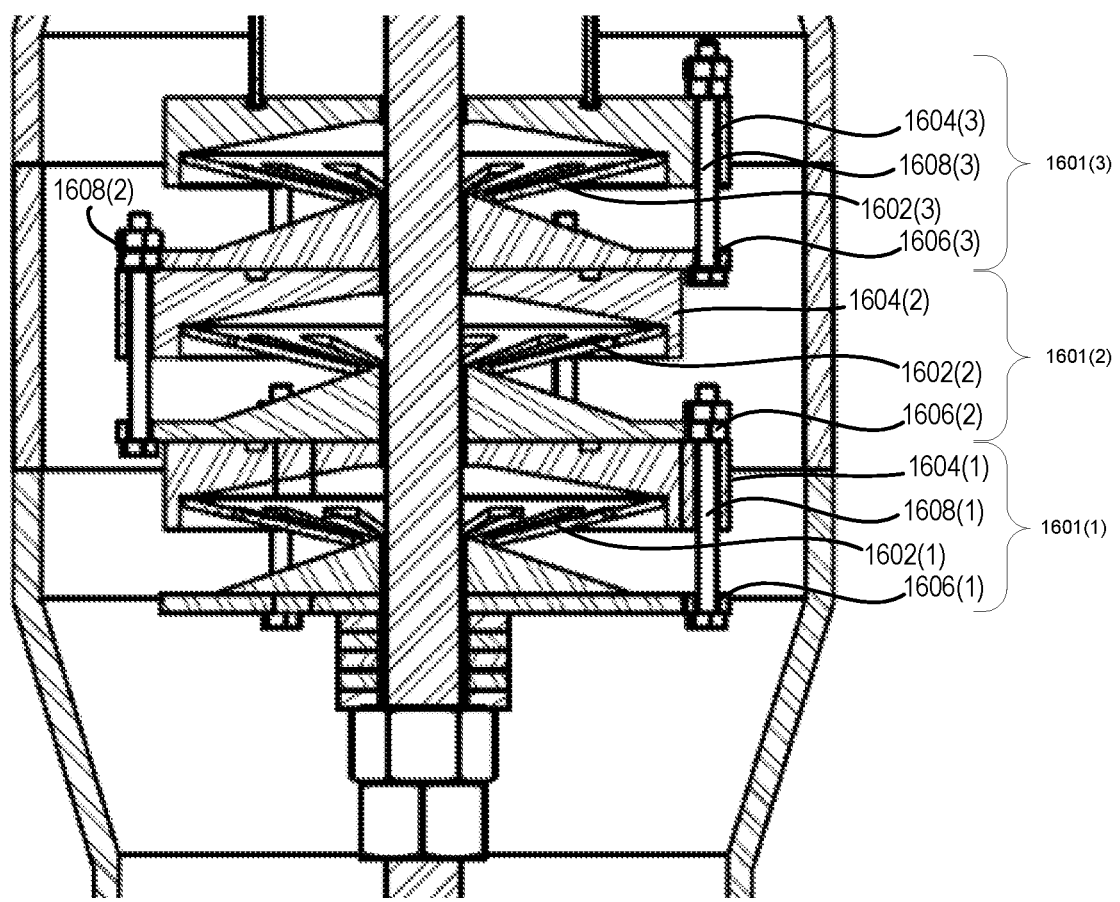
FIG. 16 depicts a cross-section view of a staged-opening diaphragm spring system, in embodiments.
Figure 17:
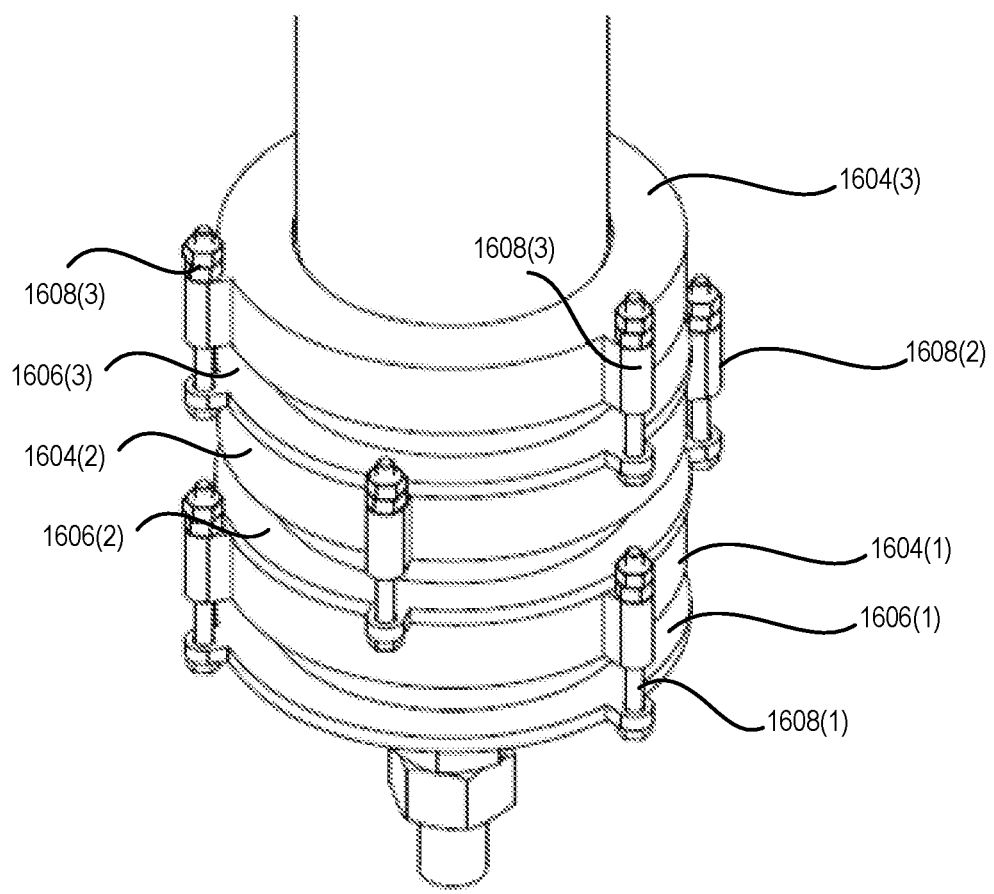
FIG. 17 depicts an isometric view of the staged-opening diaphragm spring system of FIG. 16.

FIG. 16 depicts a cross-section view of a staged-opening diaphragm spring system 1600, in embodiments. FIG. 17 depicts an isometric view of the staged-opening diaphragm spring system 1600. FIGS. 16 and 17 are best viewed together with the following description. The above embodiments discuss the diaphragm spring system 460 having a single first-case portion 604, and a single second-case portion 606 that cause a dimension change in the gas-exit slot 414 based on the first-dimension change 804. However, in at least some embodiments, such as that shown in FIGS. 16-17, the diaphragm spring system 460 includes a plurality of diaphragm spring sub-systems 1601 each comprising a set of the first-case portions 1604 and the second-case portions 1606. Each set of the first-case portions 1604 and the second-case portions 1606 may enclose a respective diaphragm spring 1602.

In at least some embodiments, the first-case portions 1604 and the second-case portions 1606 in each sub-system 1601 is coupled to each other via a casing guide 1608, which are similar to casing guides 1502 discussed above.

In embodiments, each sub-system 1601 is coupled in series with the other of the sub-systems 1601. For example, the first-case portion 1604 of one sub-system 1601 is coupled to the second-case portion 1606 of the adjacent sub-system 1601. The first-casing portion 1604 located nearest the flare bowl and forms an end of the sub-system 1601 (e.g., first-case portion 1604(3) in FIGS. 16-17) may be coupled to the spacer 608, shaft mount 410, and/or tip housing 404.

Each respective diaphragm spring 1602 in each sub-system 1601 may have a different minimum opening pressure (either via different pre-compression distances, or different spring load-characteristics, or both).

Because of the series configuration, and different minimum opening pressures (and, if configured, minimum retraction pressures), the flare 400 is configured to open to different dimensions of the gas-exit slot 414 based on the incoming gas pressure and the designed characteristics of each diaphragm spring 1602 in each sub-system 1601.

Casing guides 1502 (1608 in a sub-system configuration) may be used to pre-compress spring casings 1510 and 1512 (1604 and 1606 respectively in a sub-system configuration) similar to FIG. 8 in lieu of or in addition to compression provided by nut 610.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features:

The above described features may be combined in any manner without departing from the scope hereof. The below combination of features includes examples of such combinations, where any feature described above may also be combined with any embodiment of the aspects described below.

(A1) In a first aspect, a flare includes: a tip housing; a flare bowl movable with respect to the tip housing to vary opening dimension of a gas-exit slot between the flare bowl and the tip housing; and, a gasket located at an interface between the tip housing and the flare bowl.

(A2) In an embodiment of (A1), the gasket is sized and shaped to prevent gas-leakage at the gas slot when pressure of gas entering the flare is below a designed minimum opening pressure that causes the flare bowl to move away from the tip housing.

(A3) In any embodiment of (A1)-(A2), the gasket is located at a mounting component of the flare bowl.

(A4) In any embodiment of (A1)-(A2), the gasket being secured within the tip housing at a gas-exit edge of the tip housing.

(A5) In any embodiment of (A4), the gasket being secured within a gasket notch in the gas-exit edge of the tip housing.

(A6) In any embodiment of (A1)-(A2), the gasket being secured within the flare bowl at a gas-exit edge of the flare bowl.

(A7) In any embodiment of (A6), the gasket being secured within a gasket notch in the gas-exit edge of the flare bowl.

(A8) In any embodiment of (A1)-(A7), the flare being an coanda-based flare.

(A9) In any embodiment of (A1)-(A8), the flare being a pressure-assisted variable-slot flare.

(A10) In any embodiment of (A1)-(A9), the gasket being formed from one or more of metallic, ceramic, elastomeric material, and laminated materials.

(A11) In any embodiment of (A1)-(A10), the flare coupled to a mounting shaft; and the tip housing coupled with a shaft mount configured to retain the mounting shaft along a longitudinal axis with respect to the tip housing; wherein the flare bowl is movable with respect to the tip housing along the longitudinal axis.

(A12) In any embodiment of (A1)-(A11), including any feature described below with respect to the second aspect and embodiments thereof.

(B1) In a second aspect, a flare includes: a tip housing; a flare bowl movable with respect to the tip housing; and a diaphragm spring coupled with the flare bowl to assist in movement of the flare bowl with respect to the tip housing to vary an opening dimension of a gas-exit slot defined by the flare bowl and the tip housing.

(B2) In an embodiment of (B1), the diaphragm spring having a degressive-negative-progressive load-deflection characteristic.

(B3) In any embodiment of (B1)-(B2), the diaphragm spring being pre-compressed by a pre-compression distance selected such that the gas-exit slot remains closed when pressure of gas entering the flare is below a designed minimum opening pressure that causes the flare bowl to move away from the tip housing.

(B4) In any embodiment of (B3), the designed minimum opening pressure being 0 PSI.

(B5) In any embodiment of (B3), The flare of claim 14, the designed minimum opening pressure being greater than 0.

(B6) In any embodiment of (B1)-(B5), a first-dimension change in a height of the diaphragm spring resulting in a second-dimension change in the opening dimension of the gas-exit slot.

(B7) In any embodiment of (B6), the first-dimension change equaling the second-dimension change.

(B8) In any embodiment of (B1)-(B7), the flare bowl coupled to a mounting shaft; and the tip housing coupled with a shaft mount configured to retain the mounting shaft along a longitudinal axis with respect to the tip housing; wherein that the flare bowl is movable with respect to the tip housing along the longitudinal axis.

(B9) In any embodiment of (B8), the diaphragm spring located in a spring casing coupled to the shaft mount; and the mounting shaft passing through the spring casing and the diaphragm spring.

(B10) In any embodiment of (B9), the spring casing including a first-case portion and a second-case portion, the first-case portion fixedly positioned with respect to the tip housing, the diaphragm spring located between the first-case portion and the second-case portion.

(B11) In any embodiment of (B10), the first-case portion fixedly coupled to the shaft mount.

(B12) In any embodiment of (B10), the first-case portion fixedly coupled to the tip housing.

(B13) In any embodiment of (B10)-(B12), the second-case portion coupled to the mounting shaft.

(B14) In any embodiment of (B13), the second-case portion directly coupled to the mounting shaft.

(B15) In any embodiment of (B13), the second-case portion coupled to the mounting shaft via a second-case-portion-retaining nut threaded to the shaft such that the second-case portion is between the second-case-portion-retaining nut and the first-case portion.

(B16) In any embodiment of (B15), further including spacers between the second-case-portion-retaining nut and the second-case portion.

(B17) In any embodiment of (B15), movement of the second-case-portion-retaining nut along the mounting shaft configured to move the second-case portion towards the first-case portion to pre-compress the diaphragm spring.

(B18) In any embodiment of (B10)-(B17), the first-case portion including a first-inclined surface extending to a spring-retaining surface on a stop projection of the first-case portion.

(B19) In any embodiment of (B18), the second-case portion including a second-inclined surface extending to the stop flange.

(B20) In any embodiment of (B10)-(B19), the first-case portion including a first-stop surface; the second-case portion including a second-stop surface; inverse of a first change in a distance between the first-stop surface and the second-stop surface resulting in a second change in the opening dimension of the gas-exit slot.

(B21) In any embodiment of (B9)-(B20), the spring casing including a stop flange establishing a stop point of the second-case portion with respect to the first-case portion.

(B22) In any embodiment of (B21), the stop flange located on the second-case portion, the stop point established when the stop flange contacts a stop projection extending from the first-case portion.

(B23) In any embodiment of (B1)-(B22), further comprising a gasket located at an interface between the tip housing and the flare bowl.

(B24) In any embodiment of (B23), the gasket being sized and shaped to prevent gas-leakage at the gas-exit slot when pressure of gas entering the flare is below a designed minimum opening pressure that causes the flare bowl to move away from the tip housing.

(B25) In any embodiment of (B23)-(B24), the gasket being located at a mounting component of the flare bowl.

(B26) In any embodiment of (B23)-(B24), the gasket being secured within the tip housing at a gas-exit edge of the tip housing.

(B27) In any embodiment of (B26), the gasket being secured within a gasket notch in the gas-exit edge of the tip housing.

(B28) In any embodiment of (B23)-(B24), the gasket being secured within the flare bowl at a gas-exit edge of the flare bowl.

(B29) In any embodiment of (B28), the gasket being secured within a gasket notch in the gas-exit edge of the flare bowl.

(B30) In any embodiment of (B23)-(B29), the gasket being formed from one or more of metallic, ceramic, elastomeric material, and laminated materials.

(B31) In any embodiment of (B1)-(B30), the flare being an coanda-based flare.

(B32) In any embodiment of (B1)-(B31), the flare being a pressure-assisted variable-slot flare.

What is claimed is:

1. A flare comprising:
    a tip housing;
    a flare bowl movable with respect to the tip housing to vary opening dimension of a gas-exit slot between the flare bowl and the tip housing;
    a gasket located at an interface between the tip housing and the flare bowl; and
    a diaphragm spring coupled with the flare bowl to assist in movement of the flare bowl with respect to the tip housing to vary an opening dimension of a gas-exit slot defined by the flare bowl and the tip housing, wherein a characteristic of the diaphragm spring affects a minimum opening pressure required to open the gas-exit slot.

2. The flare of claim 1, wherein the gasket is sized and shaped to prevent gas-leakage at the gas slot when pressure of gas entering the flare is below a designed minimum opening pressure that causes the flare bowl to move away from the tip housing.

3. The flare of claim 1, wherein the gasket is located at a location selected from the group of locations consisting of:
    a mounting component of the flare bowl,
    secured within the tip housing at a gas-exit edge of the tip housing, and
    secured within the flare bowl at a gas-exit edge of the flare bowl.

4. The flare of claim 3, wherein the gasket is located in the mounting component of flare bowl, and the mounting component is located within the tip housing such that the gasket interacts with the tip housing to prevent gas-leakage through the gas-exit slot when pressure of gas entering the flare is below a designed minimum opening pressure that causes the flare bowl to move away from the tip housing.

5. The flare of claim 3, wherein the gasket is secured within a gasket notch in the gas-exit edge of the tip housing.

6. The flare of claim 3, wherein there are a plurality of gaskets such that there is one gasket at at least two of the locations in the group of locations.

7. The flare of claim 3, wherein the gasket is secured within a gasket notch in the gas-exit edge of the flare bowl.

8. The flare of claim 1, wherein the gasket is formed from one or more of metallic, ceramic, elastomeric material, and laminated materials.

9. The flare of claim 8, wherein the gasket is formed from one or more elastomeric materials.

10. The flare of claim 1, wherein the flare is coupled to a mounting shaft; and the tip housing is coupled with a shaft mount configured to retain the mounting shaft along a longitudinal axis with respect to the tip housing; wherein the flare bowl is movable with respect to the tip housing along the longitudinal axis, and wherein the diaphragm spring is coupled to the mounting shaft so as to assist in movement of the flare bowl with respect to the tip housing to vary the opening dimension of the gas-exit slot, and wherein the diaphragm spring has a load-deflection characteristic selected from the group consisting of:
    a degressive-negative load-deflection characteristic,
    a degressive-negative-progressive load-deflection characteristic, a
    degressive-horizontal load-deflection characteristic, and
    a degressive-horizontal-progressive load-deflection characteristic.

11. A flare comprising:
    a tip housing;
    a flare bowl movable with respect to the tip housing;
    a spring casing including a first-case portion and a second-case portion, the first-case portion fixedly positioned with respect to the tip housing, the second-case portion is coupled with the flare bowl; and
    a diaphragm spring coupled with the flare bowl to assist in movement of the flare bowl with respect to the tip housing to vary an opening dimension of a gas-exit slot defined by the flare bowl and the tip housing, the diaphragm spring located in the spring casing between the first-case portion and the second case portion, the diaphragm spring extending between an upper-inner surface of the first-case portion and a lower-inner surface of the second-case portion.

12. The flare of claim 11, wherein the diaphragm spring has a load-deflection characteristic selected from the group consisting of:
    a degressive-negative load-deflection characteristic,
    a degressive-negative-progressive load-deflection characteristic,
    a degressive-horizontal load-deflection characteristic, and
    a degressive-horizontal-progressive load-deflection characteristic.

13. The flare of claim 11, wherein the diaphragm spring is pre-compressed by a pre-compression distance selected such that the gas-exit slot remains closed when pressure of gas entering the flare is below a designed minimum opening pressure that causes the flare bowl to move away from the tip housing.

14. The flare of claim 13, wherein the diaphragm has a load-deflection characteristic which is either a degressive-negative load-deflection characteristic of a degressive-negative-progressive load-deflection characteristic, and wherein the pre-compression distance is selected such that a diaphragm spring is placed past the maximum force which delineates degressive and negative portions of the load curve.

15. The flare of claim 11, further comprising:
    a mounting shaft coupled to the flare bowl;
    a shaft mount coupled to the tip housing, wherein the shaft mount is configured to retain the mounting shaft along a longitudinal axis with respect to the tip housing such that the flare bowl is movable with respect to the tip housing along the longitudinal axis, wherein the first-case portion is fixedly positioned with respect to the tip housing by either fixedly coupling the first-case portion to the shaft mount or fixedly coupling the first-case portion to the tip housing and the second-case portion is coupled with the mounting shaft, the mounting shaft passing through the spring casing and the diaphragm spring.

16. The flare of claim 15, wherein the second-case portion is coupled to the mounting shaft via a second-case-portion-retaining nut threaded to the shaft such that the second-case portion is between the second-case-portion-retaining nut and the first-case portion such that movement of the second-case-portion-retaining nut along the mounting shaft is configured to move the second-case portion towards the first-case portion to pre-compress the diaphragm spring.

17. The flare of claim 15, wherein:

the first-case portion includes a first-inclined surface extending to a spring-retaining surface on a stop projection of the first-case portion;

the second-case portion includes a second-inclined surface extending to a stop flange, and the stop projection and stop flange are configured to establish a stop point of the second-case portion with respect to the first-case portion; and wherein the first-case portion and the second-case portion are configured such that a change in a distance between the first-stop surface and the second-stop surface results in an inverse change in the opening dimension of the gas-exit slot.

18. The flare of claim 16, wherein movement of the second-case-portion-retaining nut along the mounting shaft is configured to affect a minimum opening pressure needed to open the gas-exit slot.

19. The flare of claim 11, further comprising a gasket located at an interface between the tip housing and the flare bowl, wherein the gasket is configured to prevent gas-leakage at the gas-exit slot when pressure of gas entering the flare is below a designed minimum opening pressure that causes the flare bowl to move away from the tip housing, and wherein the gasket is located at a location selected from the group of locations consisting of:

a mounting component of the flare bowl, secured within the tip housing at a gas-exit edge of the tip housing, and secured within the flare bowl at a gas-exit edge of the flare bowl.

20. The flare of claim 19, wherein the gasket is located in the mounting component of the flare bowl, and the mounting component is located within the tip housing such that the gasket interacts with the tip housing to prevent gas-leakage through the gas-exit slot when pressure of gas entering the flare is below a designed minimum opening pressure that causes the flare bowl to move away from the tip housing.

21. The flare of claim 19, wherein there are a plurality of gaskets such that there is one gasket at at least two of the locations in the group of locations.

22. The flare of claim 11, wherein the diaphragm spring includes a plurality of diaphragm spring sub-systems, each diaphragm spring sub-systems comprising a respective first-case portions, a respective second-case portions, and a respective diaphragm spring enclosed by the corresponding first-case portion and second-case portion.

* * * * *